(12) United States Patent
Uchida et al.

(10) Patent No.: US 7,698,039 B2
(45) Date of Patent: Apr. 13, 2010

(54) MOBILE COMMUNICATION SYSTEM

(75) Inventors: Isao Uchida, Tokyo (JP); Akira Nagashima, Tokyo (JP); Akira Miura, Tokyo (JP); Chie Sato, Tokyo (JP)

(73) Assignee: Yokogawa Electric Corporation, Musashino-shi, Tokyo (JP)

( * ) Notice: Subject to any disclaimer, the term of this patent is extended or adjusted under 35 U.S.C. 154(b) by 1254 days.

(21) Appl. No.: 11/218,782

(22) Filed: Sep. 6, 2005

(65) Prior Publication Data

US 2006/0062573 A1 Mar. 23, 2006

(30) Foreign Application Priority Data

Sep. 7, 2004 (JP) .................. P. 2004-259253

(51) Int. Cl.
*H04B 10/00* (2006.01)
(52) U.S. Cl. .............. 701/48; 398/20; 398/27; 370/386; 370/352; 370/400; 370/408; 709/238
(58) Field of Classification Search .......... 701/48, 701/29; 725/74; 398/20, 27, 162; 370/218, 370/254, 386, 352, 395.5, 400, 908, 408; 709/238; 340/438; *H04B 10/00*
See application file for complete search history.

(56) References Cited

U.S. PATENT DOCUMENTS

| | | | | | |
|---|---|---|---|---|---|
| 5,323,385 | A | * | 6/1994 | Jurewicz et al. ............. | 370/300 |
| 5,742,623 | A | * | 4/1998 | Nuber et al. ................ | 714/798 |
| 5,801,865 | A | * | 9/1998 | Weis et al. .................. | 398/113 |
| 7,136,426 | B2 | | 11/2006 | Okada et al. | |
| 7,596,539 | B2 | * | 9/2009 | Chatterjee et al. ............ | 706/47 |
| 2001/0025376 | A1 | * | 9/2001 | Knobl ........................ | 725/74 |
| 2002/0094035 | A1 | | 7/2002 | Okada et al. | |
| 2002/0099487 | A1 | * | 7/2002 | Suganuma et al. ............ | 701/48 |
| 2002/0116103 | A1 | * | 8/2002 | Matsunaga et al. ............ | 701/29 |
| 2003/0018422 | A1 | * | 1/2003 | Akiyama ..................... | 701/48 |
| 2003/0033067 | A1 | * | 2/2003 | Arita et al. ................... | 701/48 |
| 2003/0088353 | A1 | * | 5/2003 | Heckmann et al. ............ | 701/48 |

(Continued)

FOREIGN PATENT DOCUMENTS

JP 61251247 A * 11/1986

(Continued)

OTHER PUBLICATIONS

"Introduction to CAN", Renesas Technology Corp Rev. 4.00, Apr. 20, 2004, pp. 1-47, Abstract.

(Continued)

*Primary Examiner*—Tuan C To
(74) *Attorney, Agent, or Firm*—Sughrue Mion, PLLC

(57) ABSTRACT

The present invention makes improvements in a mobile communication system that performs a communication via a communication network provided in a mobile body to execute a data transfer. The present system comprises a plurality of nodes, a path control device which receives data from the nodes respectively, selects a path for the data transfer on the communication network, and outputs the data, first optical fibers which connect each of the nodes and the path control device and transfer the data, and second optical fibers provided in parallel with the first optical fibers. In the present system, the path control device communicates with the node via the second optical fiber when a failure occurs in the first optical fiber.

6 Claims, 4 Drawing Sheets

U.S. PATENT DOCUMENTS

2003/0093798 A1* 5/2003 Rogerson ..................... 725/75
2005/0243797 A1* 11/2005 Schrodi ..................... 370/352

FOREIGN PATENT DOCUMENTS

| JP | 62123873 A | * | 6/1987 |
| JP | 2-092132 A | | 3/1990 |
| JP | 29042960 B2 | | 6/1999 |
| JP | 2002-175597 A | | 6/2002 |
| JP | 2002-185490 A | | 6/2002 |

OTHER PUBLICATIONS

Japanese Office Action dated Jan. 19, 2009.

* cited by examiner

MOBILE COMMUNICATION SYSTEM

This application claims foreign priority based on Japanese Patent application No. 2004-259253, filed Sep. 7, 2004, the contents of which is incorporated herein by reference in its entirety.

BACKGROUND OF THE INVENTION

1. Field of the Invention

The present invention relates to a mobile communication system provided in a mobile body, for communicating via a communication network so as to transfer data. More particularly, the present invention relates to a mobile communication system capable of enhancing flexibility in a layout of the communication network and improving reliability.

2. Description of the Related Art

In recent years, there is a remarkable progress in higher functioning and computerization of the mobile body such as a car, an airplane, a train and a vessel. According to the higher functioning and the computerization, numbers of sensors, in-vehicle equipments, signal lines (e.g., wire harnesses) for connecting the sensors and the in-vehicle equipments, and the like, which are installed in the mobile body, are steadily increasing.

Therefore, for the purpose of achieving the reduction in weight of the wire harnesses and also sharing the vehicle information, an introduction of an in-vehicle network having high-speed and large-capacity is being promoted.

FIG. 3 is a view showing a configuration of a mobile communication system of the related art (for example, refer to JP-A-2002-175597). In this case, explanation will be made with the car as an example of the mobile body. In FIG. 3, a vehicle total-control device 11 issues the instructions to various control units respectively by using information from sensors so as to execute the control of the vehicle entirely. An image processing camera 12 and a radar 13 are sensors for recognizing a driving environment. An engine control unit 14, a transmission control unit 15, a brake control unit 16, and a steering control unit 17 are control units respectively, and control various in-vehicle equipments (not shown) connected to the control units.

A wire harness 18 is a bus that connects the vehicle total-control device 11, the sensors 12, 13, and the control units 14 to 17 mutually respectively. Also, a wire harness 19 is a bus that connects the vehicle total-control device 11, the sensors 12, 13, and the control units 14 to 17 mutually respectively, as well as the wire harness 18. In this case, the wire harness 18 is a signal line that is normally used, and the wire harness 19 is a signal line for fail-safe that is used when the failure occurs in the wire harness 18.

An operation of such mobile communication system will be explained hereunder.

The vehicle total-control device 11 communicates with the sensors 12, 13 via the wire harness 18, and collects various information relating to the driving environment. In this case, the information may be collected from other sensors which are not shown (for example, a speed sensor, a tire pressure sensor, etc.). Then, the vehicle total-control device 11 communicates with control units 14 to 17 via the wire harness 18 respectively and issues the instructions based on the information from the sensors 12, 13. Then, control units 14 to 17 controls the in-vehicle equipments (not shown) in compliance with these instructions.

Also, when the vehicle total-control device 11 cannot perform communication since the failure occurs in the wire harness 18, the vehicle total-control device 11 performs communication using the wire harness 19 for fail-safe so as to transfer data.

Then, FIG. 4 is a view showing another configuration of the mobile communication system in the related art (for example, refer to Japanese Patent No. 2904296). FIG. 3 shows the bus connection type network in which all the devices (the vehicle total-control device 11, the sensors 12, 13, and control units 14 to 17) are connected to the wire harnesses 18, 19 in parallel. The devices having high relevancy may be grouped together based on the number of the sensors 12, 13 and the control units 14 to 17 and the purpose of application.

Here, in FIG. 4, the same reference symbols are affixed to the same portions as those in FIG. 3, and their explanation will be omitted herein. In FIG. 4, a gateway 20 is provided instead of the vehicle total-control device 11. A driving system network 100 is a network in which the devices related to driving are grouped together, and is provided with the sensors 12, 13, and the control units 14 to 17.

A car body system network 101 is a network in which devices related to the car body are grouped together, and is provided with a temperature sensor 21, an illuminance sensor 22, an air conditioner control unit 23, a lamp control unit 24, and a wiper control unit 25.

An information system network 102 is a network in which the devices related to music, image, etc. are grouped together, and is provided with an audio control unit 26, and a navigation control unit 27. In the respective networks 100 to 102, each units and sensors are connected mutually via the wire harnesses 18, 19. In this case, the sensors 12, 13, 21, 22, and the control units 14 to 17, 23 to 27 are nodes. Also, respective networks 100 to 102 are connected mutually with the gateway 20.

An operation of such system will be explained.

The gateway 20 receives data from the nodes 12 to 17, 21 to 27 in respective networks 100 to 102, and issues instructions to the control units 14 to 17, 23 to 27 based on the data. The control units 14 to 17, 23 to 27 respectively control the in-vehicle equipments in compliance with the instructions. In addition, the gateway 20 performs data transfer between the different networks (e.g., transfer data from the network 100 to the network 102).

In addition, when the communication cannot be performed since the failure occurs in the wire harness 18, the data transfer is executed by performing the communication using the wire harness 19 for fail-safe. For example, when the failure occurs in the wire harness 18 in the driving system network 100, the communication is performed via the wire harness 19 for fail-safe only in the driving system network 100.

Then, the wire harnesses 18, 19 shown in FIG. 3 and FIG. 4 will be explained. As the transmission speed becomes higher, a metal transmission by the wire harness radiates noise from a transmission line and is easily influenced by noise from an external path. Therefore, the measure to suppress the radiation of the noise and the influence of the noise must be taken. However, problems occur due to an increase in cost and an increase in weight. As a result, communication via an optical fiber, which is not influenced by the noise, attracts attention nowadays.

Furthermore, as shown in FIG. 4, with the increase of the in-vehicle networks, in some cases the data handled in the in-vehicle network are classified into the car body system network (lamp, wiper, etc.) 101, the driving system network (engine, brake, etc.) 100, the information system network (navigation, audio, etc.) 102, and the like, based on the purpose of application.

In the classification shown in FIG. 4, particularly as the standard of the information system network 102, IDB-1394 (ITS Data Bus-1394) that is widespread mainly in Japan and the United States of America, and MOST (Media Oriented Systems Transfer) that is widespread mainly in Europe are developed. Also, an introduction into the real car of the in-vehicle network employing the optical fiber instead of the metal transmission is started.

However, these standards are applied to the information system network 102. In the driving system network 100 and the car body system network 101, for the reason that a transmission capacity is small and the cost can be suppressed low, the metal transmission via the wire harnesses 18, 19 is still used as the in-vehicle network.

The mobile body is used in a poor environment in which the temperature changes drastically due to the outdoor temperature and the radiant heat from the in-vehicle equipments. Therefore, the mobile communication system is also used in the poor environment. Under such situation, in order to perform the communication with high reliability, measures such as dualizing the wire harnesses 18, 19 are adopted. Of course, such a problem exists that a cost required for the measure and a weight of the wire harnesses 18, 19 are increased.

Furthermore, in the bus connection type network as shown in FIG. 3, there exists a problem that flexibility in the layout is low. In addition, since all nodes 11 to 17 are affected when the wire harnesses 18, 19 in the transmission line are disconnected, such a problem exists that the reliability is low.

Also, in FIG. 4, the in-vehicle network is divided into a plurality of networks 100 to 102, and then integrated by connecting the buses of respective networks 100 to 102 via the gateway 20. As a result, the flexibility in the layout and the reliability are improved rather than those of FIG. 3.

However, there exists a problem that, since the bus connection type network is employed in the inside of the networks 100 to 102 respectively, both the flexibility in the layout and the reliability are low. In addition, there exists a problem that, since all the information gathers in the gateway 20, the high-speed bus line is required and thus the cost is increased. Further, the gateway 20 not only controls a data path in the in-vehicle network but also serves as the central control unit that is provided in the uppermost position. Therefore, for the gateway 20, there exists a problem that the needs for high performance and reliability become high, resources required for design and development must be concentrated, and the cost is increased.

SUMMARY OF THE INVENTION

Therefore, it is an object of the present invention to achieve a mobile communication system capable of enhancing flexibility in the layout of the communication network and improving reliability.

In the present invention, a mobile communication system which is provided in a mobile body and communicates via a communication network, the system comprises a plurality of nodes, a path control device which receives data from the nodes respectively, selects a path for data transfer on the communication network, and outputs the data, first optical fibers which connect each of the nodes and the path control device to transfer the data, and second optical fibers which connect each of the nodes and the path control device, in parallel with the first optical fibers, wherein the path control device communicates with the node via the second optical fiber when a failure occurs in the first optical fiber.

In the mobile communication system of the present invention, the node is any one of a sensor, a control unit which controls an equipment provided in the mobile body, and a total-control device which performs a signal processing on information transmitted from at least one of the sensor and the control unit, and issues an instruction to the control unit.

In the mobile communication system of the present invention, the sensor transmits the data to the total-control device and the predetermined control unit via the path control device, and the predetermined control unit and the total-control device respectively process the data transmitted from the sensor independently.

The mobile communication system of the present invention further comprises a plurality of segment networks, each of the segment networks includes the plurality of nodes, the path control device, the first optical fibers, and the second optical fibers, an upper layer path control device provided in an upper layer of the path control device, third optical fibers which connect each of the path control devices and the upper layer path control device to transfer the data, and fourth optical fibers which connect each of the path control devices and the upper layer path control device, in parallel with the third optical fibers, wherein the upper layer path control device communicates with the path control device via the fourth optical fiber when a failure occurs in the third optical fiber.

The mobile communication system of the present invention further comprises a bit error correcting section which corrects a bit error, being provided in the path control device and the nodes respectively.

In the mobile communication system of the present invention, the path control device outputs a warning when a bit error rate exceeds a certain threshold value.

DESCRIPTION OF THE PREFERRED EMBODIMENTS

Hereinafter, embodiments of the present invention will be explained with reference to the drawings.

First Embodiment

Figure 1:
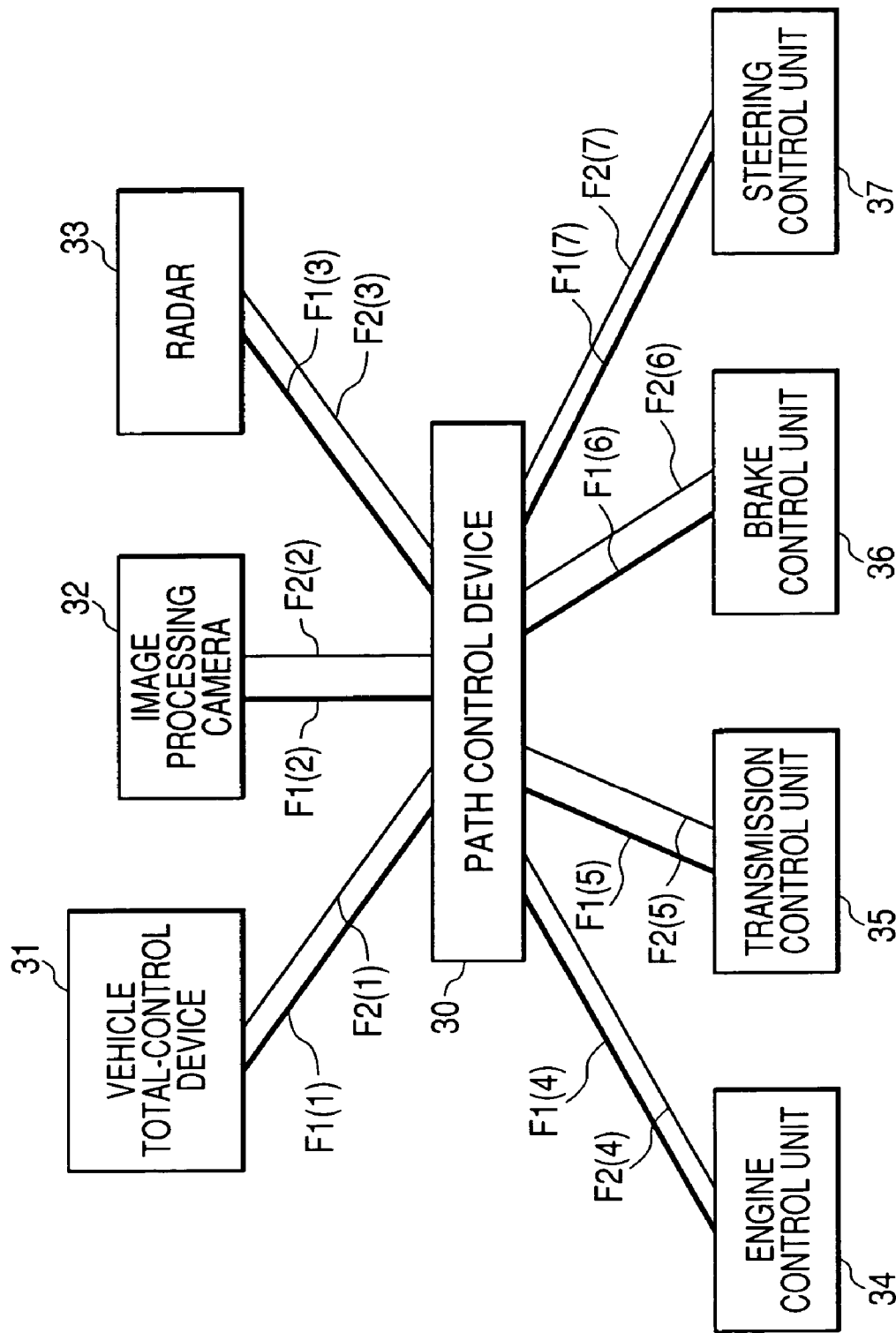
FIG. 1 is a block diagram showing a configuration of a first embodiment of the present invention.

FIG. 1 is a block diagram showing a configuration of a first embodiment of the present invention. Here, explanation will be made with a car as an example of the mobile body. In FIG. 1, a path control device 30 has a multi-input and a multi-output, selects a path for data transfer on the communication network, and then outputs data being input from an input port from the selected output port.

A vehicle total-control device 31 issues instructions to each control unit by using information from at least one of sensors and various control units, and controls the vehicle entirely. An image processing camera 32 and a radar 33 are sensors, and used to recognize a driving environment. An engine control unit 34, a transmission control unit 35, a brake control unit 36, and a steering control unit 37 are control units, each of which controls in-vehicle equipments (not shown) connected to the control unit itself. In other words, the control units 34 to 37 are provided in the upper position than the in-vehicle equipments (not shown). Also, the vehicle total-control device 31, the image processing camera 32, the radar 33, and the control units 34 to 37 are nodes.

A first optical fiber F1(n) (where n is a natural number) is provided for respective nodes 31 to 37, and connects the nodes 31 to 37 and the path control device 30 so as to transmit the data. A second optical fiber F2(n) is provided in parallel with the first optical fiber, and connects the nodes 31 to 37 and the path control device 30 so as to transmit the data.

Particularly, the optical fibers F1(1), F2(1) connect the vehicle total-control device 31 and the path control device 30. The optical fibers F1(2), F2(2) connect the image processing camera 32 and the path control device 30. Similarly the optical fibers F1(3) to F1(7), F2(3) to F2(7) connect respective nodes 33 to 37 and the path control device 30.

That is, in the communication network, the nodes 31 to 37 are connected radially with the path control device 30 as the central device. Also, the path control device 30 and respective nodes are connected by the dual optical fibers F1(n), F2(n) In this case, the optical fibers F1(n) are the signal lines for normal use, and the optical fibers F2(n) are the signal lines for fail-safe used when the failure occurs in the optical fibers F1(n).

An operation of such mobile communication system will be explained hereunder.

The image processing camera 32 and the radar 33 respectively measures data related to the driving environment, then splits the data into packets, and then transmits the packets to the path control device 30 via the optical fibers F1(2), F2(3). In this case, an address of which destination is the vehicle total-control device 31 is attached to the header portion of the packet.

Next, the path control device 30 selects a path to the vehicle total-control device 31, i.e., the optical fiber F1(1), by referring to the header of the received packet. Then, the path control device 30 outputs the received packet to the vehicle total-control device 31.

Furthermore, the vehicle total-control device 31 extracts various information related to the driving environment from the received packet. In this case, the information may be collected from other sensors (not shown) such as a speed sensor and a tire pressure sensor. Then, a signal processing section (not shown) provided in the vehicle total-control device 31 performs signal processing on the information from the sensors 32, 33, and issues instructions to respective control units 34 to 37 based on the processed result. For example, the vehicle total-control device 31 issues the instruction for speed control to the engine control unit 34 and the brake control unit 36, issues the instruction for shift transmission control to the transmission control unit 35, and issues the instruction for steering angle control to the steering control unit 37.

Then, the vehicle total-control device 31 packetizes the instructions to respective control units 34 to 37. Also, the address of which destination is the control units 34 to 37 (e.g., the engine control unit 34) that provide the instruction is attached to the header portion of the packet.

Next, the path control device 30 selects the path to the engine control unit 34, i.e., the optical fiber F1(4), by referring to the header of the received packet. Then, the path control device 30 outputs the received packet to the engine control unit 34. Furthermore, the engine control unit 34 controls the in-vehicle equipment (not shown) in compliance with the instruction included in the packet.

The path control device 30 monitors the status of the optical fibers F1(n). Then, when the failure occurs in the optical fiber F1(n) and the communication cannot be established, the communication is performed by switching only the optical fiber F1(n) in which the failure occurred to the optical fiber F2(n) for fail-safe so as to execute the data transfer. For example, when the failure occurs in the optical fiber F1(1), the optical fiber F2(1) for fail-safe is used. For the other paths, the optical fibers F1(2) to F1(7) for normal use are used.

In this manner, the nodes 31 to 37 are connected to the path control device 30 via individual optical fibers F1(n), F2(n) respectively. Also, the nodes 31 to 37 are connected in a way of being dualized with the optical fibers F1(n), F2(n). Then, the path control device 30 selects the optimum path for the packets received from the nodes 31 to 37, and outputs the packets. Accordingly, flexibility in the layout of the communication network is enhanced and reliability is improved. As a result, the flexibility of function executed by the nodes 31 to 37 can be increased, and an extension of the network can be easily conducted. The equipments required to improve the reliability can be suppressed, and a total cost can be suppressed low.

Also, since the path control device 30 outputs the packet only to the path of its destination, unnecessary packets are not output to the optical fibers F1(n), F2(n) and the nodes 31 to 37. In other words, even when the traffic is increased, the collision between the packets can be suppressed and the communication can be carried out at a high speed without fail. As a result, the reliability can be improved and thus the car can be controlled safely.

Second Embodiment

Figure 2:
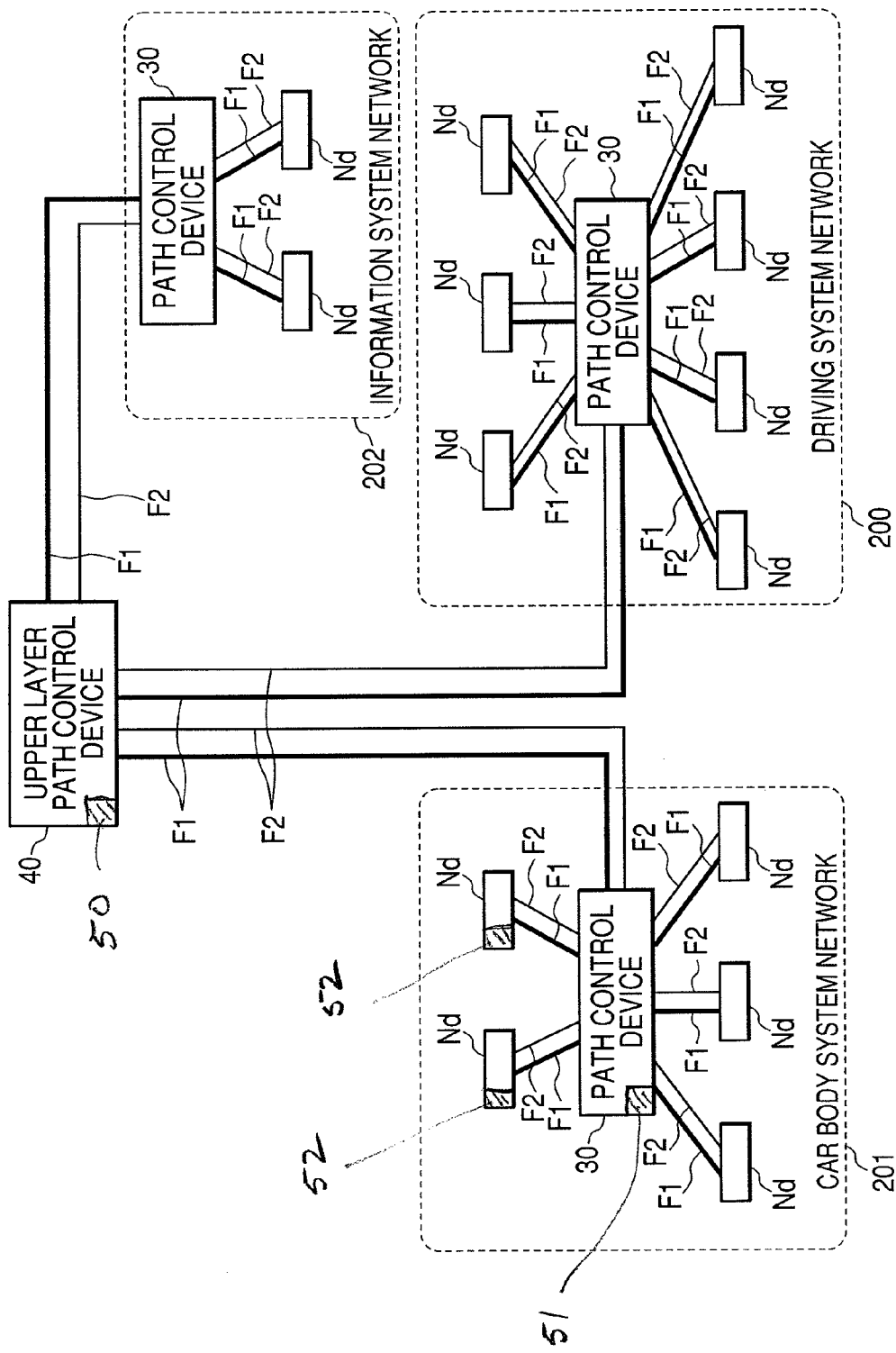
FIG. 2 is a block diagram showing a configuration of a second embodiment of the present invention.
Figure 3:
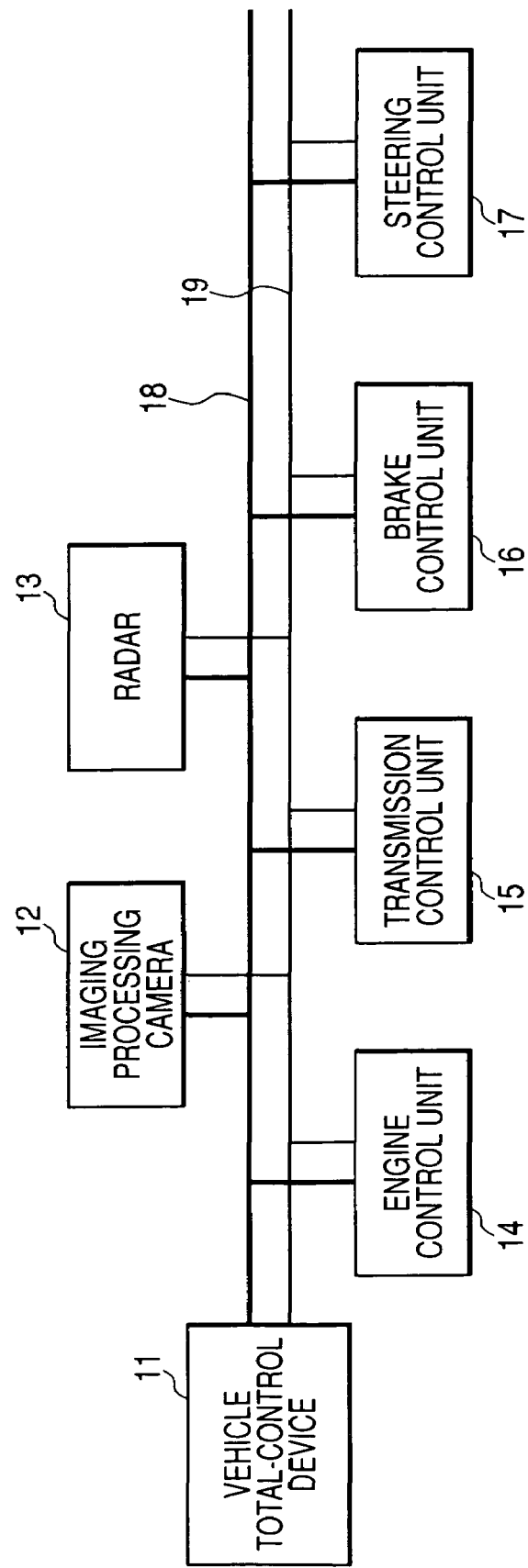
FIG. 3 is a view showing a configuration of a mobile communication system in the related art.
Figure 4:
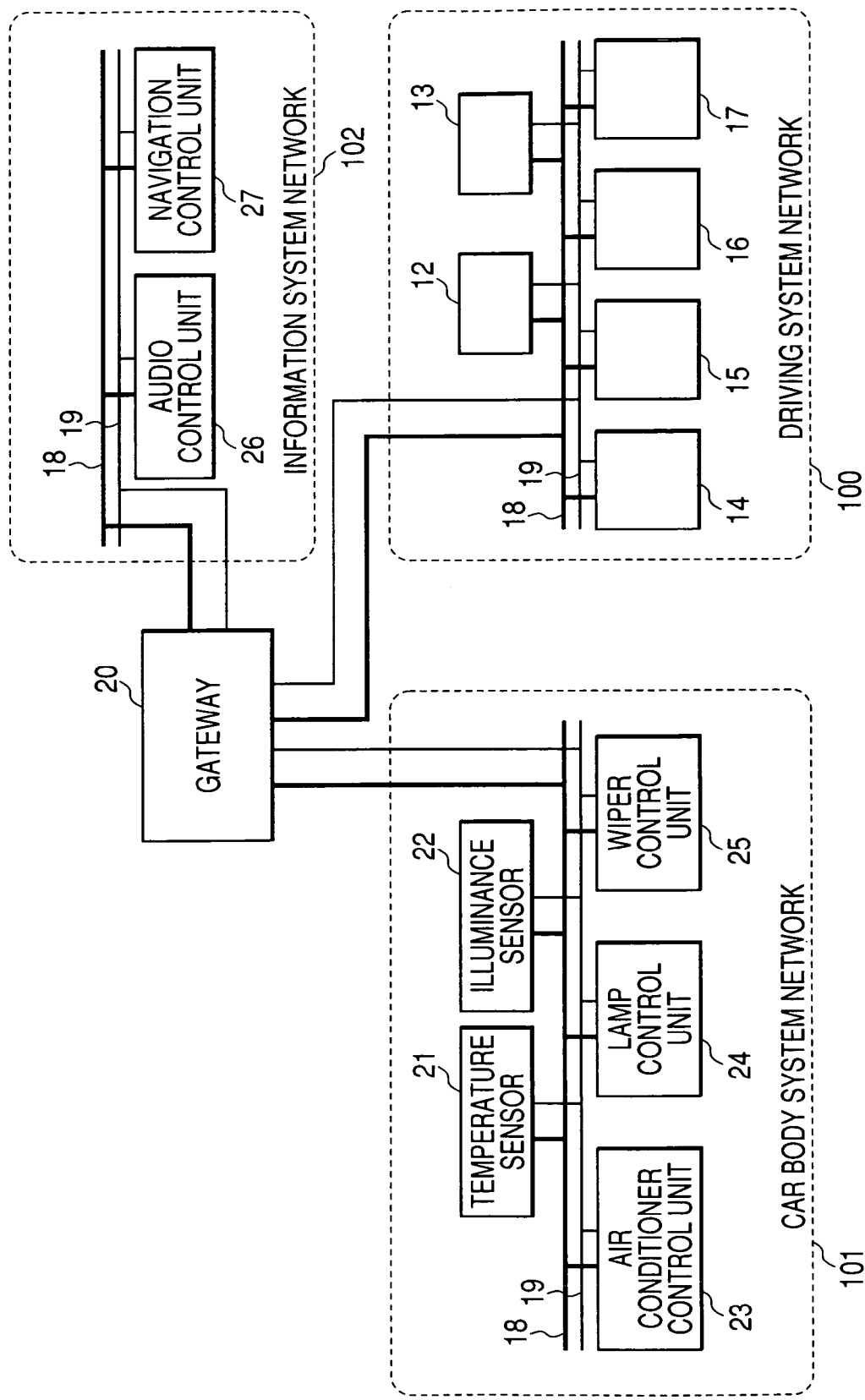
FIG. 4 is a view showing another configuration of a mobile communication system in the related art.

FIG. 2 is a block diagram showing a configuration of a second embodiment of the present invention. In this case, the same reference symbols are affixed to the same portions as those in FIG. 1, and their explanation will be omitted herein. FIG. 2 shows an example in which the devices having high relevancy are grouped together based on the number of the nodes provided inside the vehicle as shown in FIG. 4 and the purpose of application, and segmented. FIG. 2 shows an example in which the communication network is provided with the path control device 30 as a central device as shown in FIG. 1 for every network that is segmented.

In FIG. 2, a driving system network 200 is a network in which the devices related to driving are grouped together, a car body system network 201 is a network in which devices related to the car body are grouped together, and an information system network 202 is a network in which the devices related to music, image, etc. are grouped together.

The path control device 30 and a plurality of nodes Nd are provided to in the networks 200 to 202 respectively. Each node Nd is connected to the path control device 30 in the networks 200 to 202 where the node Nd belongs, in a way of being dualized with the first optical fiber F1 and the second optical fiber F2. In this case, the node corresponds to any one of the sensors, the control units, and the total-control unit (the vehicle total-control unit for controlling the overall vehicle and the total-control unit for controlling the respective networks 200 to 202).

Also, an upper layer path control device 40 is provided in the layer higher than the path control device 30, and is connected to each of the path control devices 30 in the networks 200 to 202 in a way of being dualized with the first optical fibers F1 and the second optical fibers F2.

An operation of such mobile communication system will be explained hereunder.

The node Nd outputs the packet to the path control device 30 via the optical fiber F1. Then, the path control device 30 selects the appropriate path based on the destination address of the packet. Here, when the node Nd provided in the different networks 200 to 202 is the destination, the packet is output to the upper layer path control device 40. When the node Nd provided in one of the networks 200 to 202 where the node Nd outputting the packet belongs is the destination, the packet is output to the node Nd in one of the networks 200 to 202 where the node Nd outputting the packet belongs, but not to the upper layer path control device 40.

Then, the upper layer path control device 40 selects the appropriate path based on the destination address of the received packet, and outputs the packet to the path control device 30 in the networks 200 to 202. That is, the upper layer path control device 40 has a function of a router, and performs segmentation of respective layers.

Also, the path control device 30 and the upper layer path control device 40 monitor the state of the optical fibers F1. Then, when the failure occurs in the optical fiber F1 and the communication can not be performed, the communication is performed by switching only the optical fiber F1 in which the failure occurred to the optical fiber F2 for fail-safe, and the data transfer is executed.

In this manner, the path control device 30 and the upper layer path control device 40 are connected hierarchically, only the necessary information (the packetized data) is transmitted between the networks 200 to 202.

In this case, the present invention is not limited to this, and systems shown in the following (a) to (d) may be employed.

(a) In the system shown in FIG. 1 and FIG. 2, such a configuration is shown that the optical fibers F1, F2, F1(n), F2(n) are provided as a signal line. Unlike the metal transmission, the optical fibers F1, F2, F1(n), F2(n) do not radiate the noise and are not influenced by the noise from the outside path. However, a bit error tends to occur due to the high speeding and the larger volume of the data transmission. Therefore, a bit error correcting section 50-52 may be provided in the nodes 31 to 37, Nd and the path control devices 30, 40 respectively.

An operation of such mobile communication system will be explained hereunder. In this case, portions concerning the bit error correcting section will be explained mainly. First, the bit error correcting section of the nodes 31 to 37, Nd on the transmission side adds an error correcting code to the transmission data, and transmits the data to the path control device 30. Then, the bit error correcting section of the path control device 30 performs the error correction of the data contained in the received packet. In addition, the path control device 30 adds the error correcting code to the corrected data again, and transmits the data to the nodes 31 to 37, Nd on the reception side. Then, the nodes 31 to 37, Nd on the reception side performs the error correction of the received data. Similarly, the bit error correcting section of the upper layer path control device 40 performs the error correction of the data transmitted from the path control device 30.

In this manner, the bit error correcting section of the nodes 31 to 37, Nd, and the path control devices 30, 40 perform the correction of the bit error. Therefore, though in the high speeding and the larger volume of the data transmission, the data transfer can be carried out precisely and also the reliability can be increased. As a result, it is possible to control the car safely.

Also, the path control devices 30, 40 may monitor a bit error rate, and when the bit error rate exceeds a certain threshold value, the path control devices 30, 40 may issue a warning to the user indicating that the maintenance, etc. should be done urgently. Therefore, generation of the failure can be suppressed and also the reliability can be increased. As a result, it is possible to control the car safely.

In addition, the path control devices 30, 40 may monitor the bit error rate, and when the bit error rate exceeds a certain threshold value, the path control devices 30, 40 determine that the failure occurs in the optical fibers F1, F1(n) which are the paths whose bit error rate is high. Then, the path control devices 30, 40 switch the path to the optical fibers F2, F2(n) for fail-safe.

(b) In the system shown in FIG. 1, such a configuration is shown that the signal processing section (not shown) in the vehicle total-control device 31 performs signal processing on the information from the sensors 32, 33, and issues the instruction to the nodes 32 to 37 based on the processed result. However, such signal processing section may be arranged in a distributed way. That is, the signal processing section may be provided in respective control units 34 to 37. Then, the sensors 32, 33 may transmit the packet to the vehicle total-control device 31 and the relating control units 34 to 37 as the destination.

For example, for the information related to the steering, the vehicle total-control device 31 and the steering control unit 37 may be selected as the destination. In this case, the signal processing section same as that provided in the vehicle total-control device 31 may be provided in respective control units 34 to 37. Otherwise, the signal processing section whose function is limited only to the portions related to respective control units 34 to 37 may be provided in respective control units 34 to 37.

Then, normally the signal processing section in respective control units 34 to 37 controls the lower layer in-vehicle equipments based on the information from the sensors 32, 33. Meanwhile, the vehicle total-control device 31 monitors the signal processing section in respective control units 34 to 37. When the failure occurs, the signal processing section in the vehicle total-control device 31 issues the instruction such as to stop the vehicle safely, as the temporal alternative.

In this manner, the signal processing section is provided in the vehicle total-control device 31 and the control units 34 to 37 in a distributed way, and the signal processing section in the vehicle total-control device 31 and the signal processing section in the control units 34 to 37 respectively process the information fed from the sensors 32, 33 independently. Therefore, even though the failure occurs in the signal processing section in the vehicle total-control device 31 or the control units 34 to 37, it is possible to control the in-vehicle equipments. As a result, the reliability can be improved and the car can be controlled safely.

(c) In the systems shown in FIG. 1 and FIG. 2, such a configuration is shown that the mobile communication system is provided in a car. However, such mobile communication system may be provided in other mobile bodies such as an airplane, a vessel, a train.

(d) In the system shown in FIG. 1 and FIG. 2, such a configuration is shown that the second optical fibers F2, F2(n) are provided in parallel with and physically close to the first optical fibers F1, F1(n). However, the second optical fibers F2, F2(n) may be provided in parallel with and physically remote from the first optical fibers F1, F1(n) For example, the first optical fibers F1, F1(n) may be arranged on the right side of the car body, and the second optical fibers F2, F2(n) maybe arranged on the left side. Also, the first optical fibers F1, F1(n) may be arranged on the upper side of the car body, and the second optical fibers F2, F2(n) may be arranged on the lower side, and the like.

In other words, when the first optical fibers F1, F1(n) and the second optical fibers F2, F2(n) are provided physically close to each other, and when the car body is damaged by any cause (for example, a collision, an explosion, etc.), both the first optical fibers F1, F1(n) and the second optical fibers F2, F2(n) are damaged at the same time and the communication cannot be performed. However, when the second optical fibers F2, F2(n) are provided in parallel with and physically remote from the first optical fibers F1, F1(n), since the communication path is dualized to provide a redundant structure, such a possibility is decreased that both the optical fibers F1, F1(n), F2, F2(n) are damaged at the same time even though the car body is damaged. As a result, the reliability can be improved and the mobile body can be controlled safely.

According to the present invention, following advantages can be achieved.

According to the invention, the nodes are connected to the path control device via the first and second optical fibers respectively. Also, the nodes are connected via the first and second optical fibers in a dualized way. Then, the path control device selects the optimum path for the data received from the nodes, and outputs the data. Therefore, flexibility in the layout of the communication network is enhanced and also the reliability can be improved. As a result, flexibility of the function executed by the nodes can be increased, and an extension of the network can be easily conducted. Then the equipments required to improve the reliability can be suppressed, and the total cost can be suppressed low.

Also, since the path control device outputs the data only to the path of the destination, unnecessary data is not output to the first and second optical fibers and the nodes. In other words, even when the traffic is increased, collision of the data can be suppressed and also the communication can be carried out at a high speed without fail. As a result, the reliability can be improved and thus the mobile body can be controlled safely.

According to the invention, the signal processing section is provided in the vehicle total-control device and the control units in a distributed way. The vehicle total-control device and the control units respectively process the information transmitted from the sensors independently. Therefore, even though the failure occurs in the signal processing section in the vehicle total-control device or the control units, the in-vehicle equipments can be controlled. As a result, the reliability can be improved and thus the mobile body can be controlled safely.

According to the invention, the path control device and the upper layer path control device are connected hierarchically. Therefore, only the necessary data can be transmitted between the segments.

According to the invention, the bit error correcting sections of the nodes and the path control devices perform the correction of the bit error. Therefore, though in the high speeding and the larger volume of the data transmission, the data transfer can be carried out precisely and also the reliability can be increased. As a result, it is possible to control the mobile body safely.

According to the invention, the path control devices monitor the bit error rate, and when the bit error rate exceeds a certain threshold value, the path control devices issue a warning to the user indicating that the maintenance, etc. should be done urgently. Therefore, generation of the failure can be suppressed and also the reliability can be increased. As a result, it is possible to control the mobile body safely.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A mobile communication system which is provided in a mobile body and communicates via a communication network, said system comprising:
    a plurality of nodes;
    a path control device which receives data from the nodes respectively, selects a path for data transfer on the communication network, and outputs the data;
    first optical fibers which connect each of the nodes and the path control device to transfer the data; and
    second optical fibers which connect each of the nodes and the path control device, in parallel with the first optical fibers,
    wherein the path control device communicates with the node via the second optical fiber when a failure occurs in the first optical fiber,
    wherein the node is any one of
    a sensor, and
    a control unit which controls an equipment provided in the mobile body, and
    at least one node is a total-control device which performs a signal processing on information transmitted from at least one of the sensor and the control unit, and issues an instruction to the control unit, said mobile communication system further comprising:
    a bit error correcting section configured to correct a bit error, being provided in the path control device and the nodes respectively.

2. The mobile communication system as claimed in claim 1, wherein the path control device outputs a warning when a bit error rate exceeds a certain threshold value.

3. A mobile communication system which is provided in a mobile body and communicates via a communication network, said system comprising:
    a plurality of nodes;
    a path control device which receives data from the nodes respectively, selects a path for data transfer on the communication network, and outputs the data;
    first optical fibers which connect each of the nodes and the path control device to transfer the data; and
    second optical fibers which connect each of the nodes and the path control device, in parallel with the first optical fibers,
    wherein the path control device communicates with the node via the second optical fiber when a failure occurs in the first optical fiber,
    wherein the node is any one of
    a sensor, and
    a control unit which controls an equipment provided in the mobile body, and
    at least one node is a total-control device which performs a signal processing on information transmitted from at least one of the sensor and the control unit, and issues an instruction to the control unit,
    wherein the path control device configured to select a path by referring to a header of a received packet and to output a received packet to the total control device via at least one of the first and second optical fibers.

4. A mobile communication system, which is provided in a mobile body and communicates via a plurality of segment networks, said system comprising:
    a plurality of nodes;

a plurality of path control devices, each of which receives data from respective predetermined nodes, selects a path for data transfer on the communication network, and outputs the data;

a plurality of first optical fibers which connect each of the respective predetermined nodes and a respective path control device to transfer the data; and a plurality of second optical fibers which connect each of the respective predetermined nodes and the respective path control device, in parallel with the plurality of first optical fibers, wherein each path control device communicates with the respective predetermined nodes via the second optical fiber when a failure occurs in the first optical fiber, wherein each node is any one of a sensor, and a control unit which controls an equipment provided in the mobile body, and at least one respective predetermined node connected to a respective path control device is a total-control device which performs a signal processing on information transmitted from at least one of the sensor and the control unit, and issues an instruction to the control unit, said system further comprising:

a plurality of segment networks, wherein each of the segment networks includes a plurality of the nodes, a path control device, a plurality of first optical fibers, and a plurality of second optical fibers;

an upper layer path control device provided in an upper layer of the path control device;

third optical fibers which connect each of the path control devices and the upper layer path control device to transfer the data; and fourth optical fibers which connect each of the path control devices and the upper layer path control device, in parallel with the third optical fibers, wherein the upper layer path control device communicates with the path control device via the fourth optical fiber when a failure occurs in the third optical fiber, wherein the path control device configured to select a path by referring to a header of a received packet and to output a received packet to the total control device via at least one of the first and second optical fibers.

5. A mobile communication system, which is provided in a mobile body and communicates via a plurality of segment networks, said system comprising:

a plurality of nodes;

a plurality of path control devices, each of which receives data from respective predetermined nodes, selects a path for data transfer on the communication network, and outputs the data;

a plurality of first optical fibers which connect each of the respective predetermined nodes and a respective path control device to transfer the data; and a plurality of second optical fibers which connect each of the respective predetermined nodes and the respective path control device, in parallel with the plurality of first optical fibers, wherein each path control device communicates with the respective predetermined nodes via the second optical fiber when a failure occurs in the first optical fiber, wherein each node is any one of a sensor, and a control unit which controls an equipment provided in the mobile body, and at least one respective predetermined node connected to a respective path control device is a total-control device which performs a signal processing on information transmitted from at least one of the sensor and the control unit, and issues an instruction to the control unit, said system further comprising:

a plurality of segment networks, wherein each of the segment networks includes a plurality of the nodes, a path control device, a plurality of first optical fibers, and a plurality of second optical fibers;

an upper layer path control device provided in an upper layer of the path control device;

third optical fibers which connect each of the path control devices and the upper layer path control device to transfer the data; and fourth optical fibers which connect each of the path control devices and the upper layer path control device, in parallel with the third optical fibers, wherein the upper layer path control device communicates with the path control device via the fourth optical fiber when a failure occurs in the third optical fiber, said mobile communication system further comprising:

a bit error correcting section configured to correct a bit error, being provided in the path control device and the nodes respectively.

6. The mobile communication system as claimed in claim 5, wherein the path control device outputs a warning when a bit error rate exceeds a certain threshold value.

* * * * *